United States Patent
Sakata

(10) Patent No.: US 7,269,107 B2
(45) Date of Patent: Sep. 11, 2007

(54) METHOD OF DETECTING LAND PRE-PIT SIGNAL AND OPTICAL DISC PLAYER

(75) Inventor: Hisashi Sakata, Ueda (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 570 days.

(21) Appl. No.: 10/918,426

(22) Filed: Aug. 16, 2004

(65) Prior Publication Data
US 2005/0047759 A1    Mar. 3, 2005

(30) Foreign Application Priority Data
Aug. 27, 2003  (JP)  ............................ 2003-302333

(51) Int. Cl.
*G11B 7/00* (2006.01)
(52) U.S. Cl. .................................. 369/47.27; 369/44.13
(58) Field of Classification Search ............. 369/47.27, 369/44.13, 44.26, 124.07, 124.1, 59.15, 47.26, 369/47.25
See application file for complete search history.

(56) References Cited

U.S. PATENT DOCUMENTS
7,197,001 B2 * 3/2007 Hsu ..................... 369/59.27

FOREIGN PATENT DOCUMENTS
JP   2003-123260 A   4/2003

* cited by examiner

*Primary Examiner*—Nabil Hindi
(74) *Attorney, Agent, or Firm*—Birch, Stewart, Kolasch & Birch, LLP

(57) ABSTRACT

The method of the present invention is capable of securely detecting LPP signals. The method comprises the steps of: reading a push-pull signal including a wobble component and LPP components; and slice-shaping the push-pull signal with a slice signal so as to binarize the LPP components and detect the LPP signals. The method is characterized by: detecting pulse widths of the LPP signals with changing voltage of the slice signal; calculating degree of dispersion of the pulse widths of the LPP signals; stopping the change of the voltage of the slice signal when the degree of dispersion exceeds a predetermined threshold value; and correcting the voltage of the slice signal on the basis of a predetermined correction value.

6 Claims, 6 Drawing Sheets

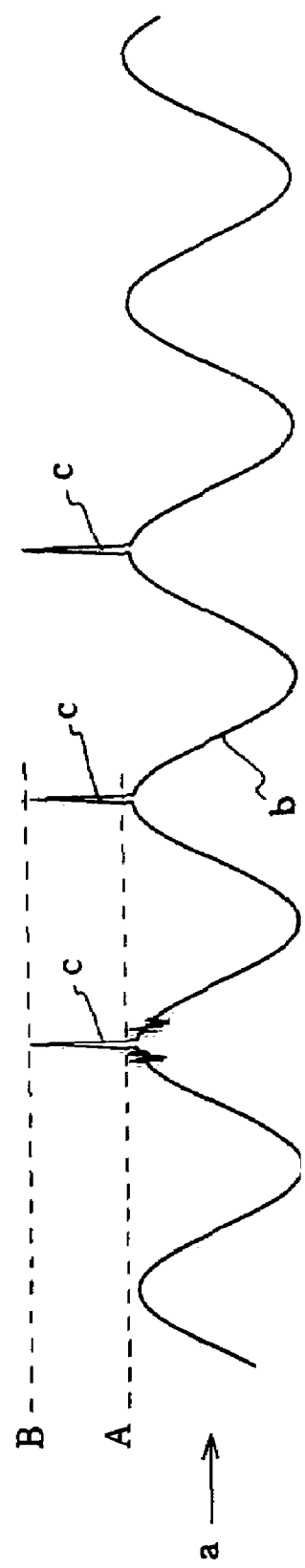

METHOD OF DETECTING LAND PRE-PIT SIGNAL AND OPTICAL DISC PLAYER

This Non-provisional application claims priority under 35 U.S.C. § 119(a) on Patent Application No(s). 2003-302333 filed in Japan on Aug. 27, 2003, the entire contents of which are hereby incorporated by reference.

BACKGROUND OF THE INVENTION

The present invention relates to a method of detecting land pre-pit (LPP) signals, in which a push-pull signal read from a digital video disk (DVD), which includes a groove and land pre-pits formed in the groove, is slice-shaped by a slice signal so as to detect LPP signals formed by binarizing LPP components, and an optical disk player performing said method.

The DVD is a data-writable DVD, e.g., DVD-R, DVD-RW, DVD+R, DVD+RW.

A phase changing material, whose phase changes between a crystal phase and a non-crystal phase, is used as a recording layer of the DVD. The recording layer is protected by a protection layer. A reflection layer is formed on the opposite side of the recording layer. The recording layer, the protection layer and the reflection layer are sandwiched between transparent plates, which are made of polycarbonate.

The recording layer of the DVD is shown in FIG. 7.

A groove 5 is spirally formed in the recording layer so as to guide a laser beam. A land 7 is spirally formed along the groove 5. The land 7 is projected from a surface of the recording layer. When the laser beam irradiates the surface of the recording layer, the phase changing material is phase-changed. The groove 5 is wobbled or meandered with a prescribed cycle. Time data can be given to an optical disk player on the basis of the cycle. Namely, the optical disk player detects wobble signals, which are based on the wobble groove 5, as time data, so as to control rotation of the disk.

Especially, in a DVD-R disk, DVD-RW disk, etc., land pre-pits (LPP) 9 are formed, as isolating pits, in the groove 5 at regular intervals. In the optical disk player, LPP signals having a prescribed cycle are used as time data for position control when data are written in the disk.

On the other hand, in an optical disk player for driving a DVD, an optical pick-up irradiate a laser beam toward the DVD and receives a beam reflected from the DVD. A light receiving element of the optical pick-up has a plurality of light receiving faces. Intensity of the reflected beam received by the light receiving faces are compared. A push-pull signal is generated on the basis of differences of the intensity of the reflected beam compared.

The push-pull signal is shown in FIG. 8.

The push-pull signal "a" is constituted by a wobble component "b", whose amplitude and wave length correspond to the wobble or the meander of the groove 5, and pulse-shaped LPP components "c", which correspond to the LPPs and which appears at regular intervals.

The LPP components "c" are projected from maximum or minimum peaks of the wobble component "b", whose wave form is similar to a sine wave.

To extract the LPP components "c" from the push-pull signal "a", signal levels are usually detected.

When the LPP components "c" exist at the peaks of the wobble component "b", signals whose voltage is higher than specific signals, which have a prescribed voltage, are regarded as the LPP components "c". The specific signals having the prescribed voltage are called slice signal. Namely, the push-pull signal "a" is compared with the slice signal, then the components "c" whose voltage are higher than the voltage of the slice signal is extracted as the LPP components "c". The LPP components "c" are binarized as LPP signals. This method is disclosed in, for example, Japanese Patent Gazette No. 2003-123260.

To extract the LPP components "c" from the push-pull signal "a" with the slice signal, voltage of the slice signal must be defined previously.

In FIG. 9, voltage of the slice signal "A" is very close to peak voltage of the wobble component "b". If the LPP components "c" is extract with the slice signal "A", noises will be extracted together with the LPP components "c". Therefore, it is difficult to securely extract only the LPP components "c" with the slice signal "A".

On the other hand, voltage of the slice signal "B" is very close to maximum voltage of the LPP components "c". If voltage of the slice signal "B" exceeds voltage of the LPP components "c", the LPP components "c" cannot be extracted. Even if the LPP components "c" are extracted, their pulse width are very small so that the LPP components "c" cannot be securely extracted.

Therefore, voltage of the slice signal must be close to the peak voltage of the wobble component "b", but it is difficult to securely extract the LPP components "c" without extracting noises.

Note that, in FIGS. 8 and 9, the LPP components "c" are projected from the maximum peaks of the wobble component "b". In another case, the LPP components "c" are projected from the minimum peaks of the wobble component "b". In this case, the voltage of the slice signal must be close to the minimum peak voltage of the wobble component "b".

SUMMARY OF THE INVENTION

The inventor of the present invention has studied to solve the above described problem, and he found that the LPP components at the peaks of the push-pull signal can be securely detected, without detecting noises, by: detecting pulse widths of the LPP signals with changing voltage of the slice signal close to that of the wobble component; and checking the detected LPP signals so as to judge if the slice signal is too close to the wobble component or not.

An object of the present invention is to provide a method of securely detecting LPP signals.

Another object is to provide an optical disk player capable of performing said method.

To achieve the objects, the present invention has following structures.

Namely, the method of detecting land pre-pit (LPP) signals from a digital video disk (DVD), in which land pre-pits are formed in a groove, comprising the steps of:

reading a push-pull signal including a wobble component and LPP components, which appear at peaks of the wobble component; and slice-shaping the push-pull signal with a prescribed slice signal so as to binarize the LPP components and detect the LPP signals, characterized by:

detecting pulse widths of the LPP signals with gradually changing voltage of the slice signal close to that of the wobble component;

calculating degree of dispersion of the pulse widths of the LPP signals;

stopping the change of the voltage of the slice signal when the degree of dispersion exceeds a predetermined threshold value; and correcting the voltage of the slice signal, which is the voltage when the degree of dispersion exceeds the threshold value, on the basis of a predetermined correction value so as to use the corrected voltage of the slice signal as the voltage of the slice signal.

With this method, a plurality of the LPP signals, which have been detected by slicing the push-pull signal, are checked with gradually changing the voltage of the slice signal close to the wobble component. When the pulse width of the LPP signals suddenly disperse, the slice signal are judged that they are overlapped with the wobble component or noises. Thus, the voltage of the slice signal is changed so as to slightly separate the slice signal away from the wobble component, so that the voltage of the slice signal can be close to the peak voltage of the wobble component without overlapping the wobble component and extracting noises. Therefore, only the LPP signals can be securely detected.

In the method, amplitude and frequency of the slice signal may be equal to those of the wobble component.

Further, in the method, the correction value may be previously determined on the basis of a type of the DVD. In this case, optimum voltage of the slice signal can be defined with considering dispersion of amplitude of the wobble component and characteristics of noises, which depend on the type of the DVD. Therefore, the LPP signals can be securely detected.

On the other hand, the optical disk player of the present invention comprises:

an optical pick-up reading a push-pull signal including a wobble component and land pre-pit (LPP) components, which appears at peaks of the wobble component, from a digital video disk (DVD), in which land pre-pits are formed in a groove;

LPP signal detecting means for slice-shaping the push-pull signal with a slice signal so as to binarize the LPP components and detect LPP signals;

means for forming the slice signal; and control means for detecting pulse widths of the LPP signals with gradually changing voltage of the slice signal close to that of the wobble component; calculating degree of dispersion of the pulse widths of the LPP signals; stopping the change of the voltage of the slice signal when the degree of dispersion exceeds a predetermined threshold value; and correcting the voltage of the slice signal, which is the voltage when the degree of dispersion exceeds the threshold value, on the basis of a predetermined correction value so as to use the corrected voltage of the slice signal as the voltage of the slice signal.

The optical disk player is capable of performing the method of the present invention. Therefore, a plurality of the LPP signals, which have been detected by slicing the push-pull signal, are checked with gradually changing the voltage of the slice signal close to the wobble component. When the pulse width of the LPP signals suddenly disperse, the slice signal are judged that they are overlapped with the wobble component or noises. Thus, the voltage of the slice signal is changed so as to slightly separate the slice signal away from the wobble component, so that the voltage of the slice signal can be close to the peak voltage of the wobble component without overlapping the wobble component and extracting noises. Therefore, only the LPP signals can be securely detected.

In the optical disk player, amplitude and frequency of the slice signal may be equal to those of the wobble component.

Further, the optical disk player may further comprise means for storing the correction value, which is previously determined on the basis of a type of the DVD. In this case, optimum voltage of the slice signal can be defined with considering dispersion of amplitude of the wobble component and characteristics of noises, which depend on the type of the DVD. Therefore, the LPP signals can be securely detected.

In the present invention, the slice signal can be close to the wobble component without overlapping the wobble component and noises thereon. Therefore, only the LPP signals can be securely detected without detecting the noises.

BRIEF DESCRIPTION OF THE DRAWINGS

Embodiments of the present invention will now be described by way of examples and with reference to the accompanying drawings, in which:

FIG. 9 is an explanation view showing the conventional process of slice-shaping the push-pull signal with the slice signal "A" and "B".

DETAILED DESCRIPTION OF THE EMBODIMENTS

Preferred embodiments of the present invention will now be described in detail with reference to the accompanying drawings.

Note that, the feature of the present invention is to use a slice signal, whose waveform is similar to around peaks of a wobble component but not similar to other parts thereof, so as to slice-shape push-pull signal and detect LPP signals, so that the LPP signals can be securely detected without detecting noises.

Figure 1:
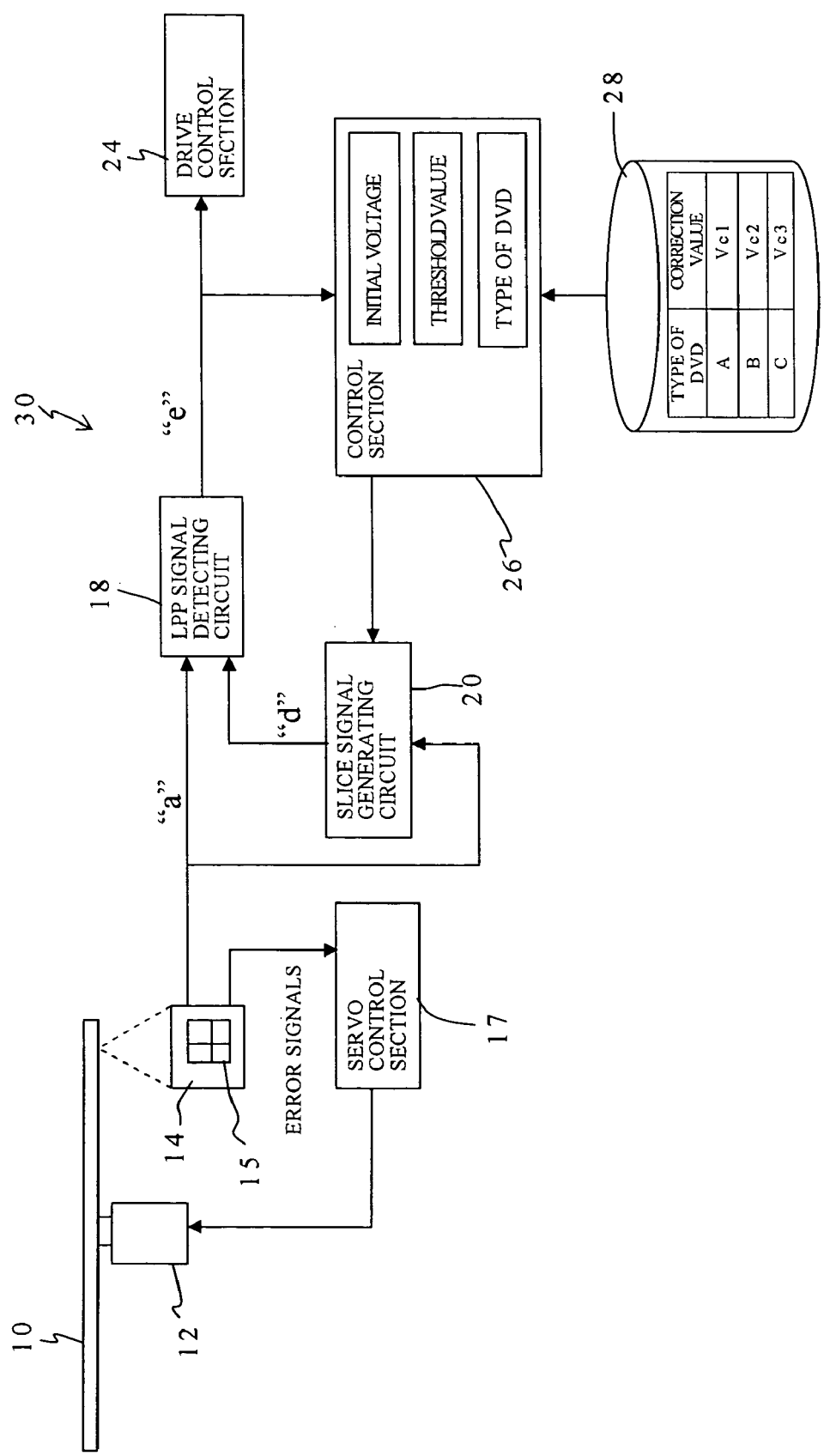
FIG. 1 is a block diagram of ant embodiment of the optical disk player of the present invention.
Figure 7:
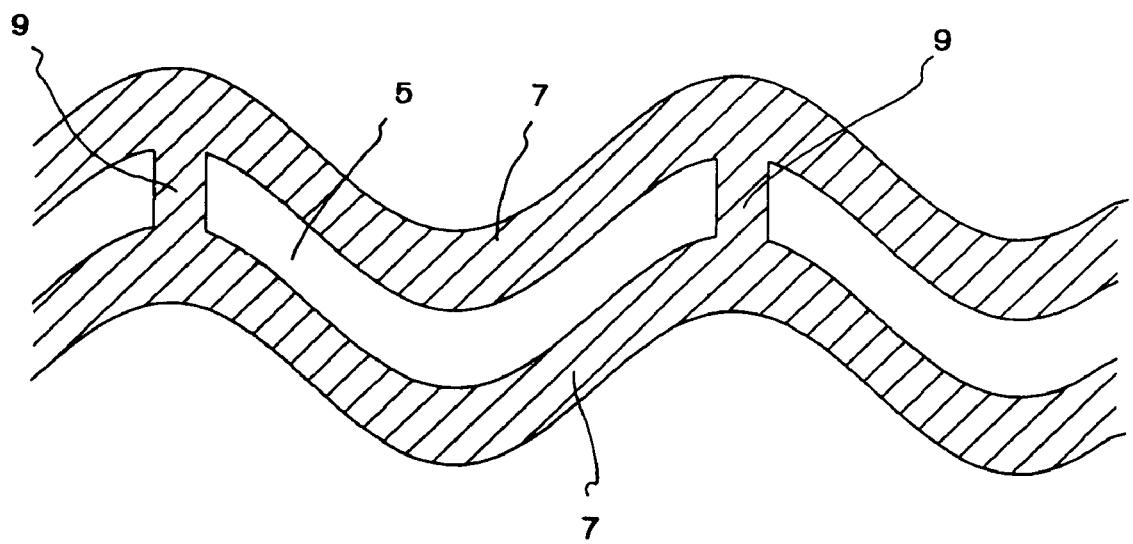
FIG. 7 is an explanation view of a recording layer of a DVD.

FIG. 1 shows a block diagram of a first embodiment of the optical disk player of the present invention, in which LPP signals are detected from a DVD including LPPs. The structure of the DVD is shown in FIG. 7 and described in BACKGROUND OF THE INVENTION. Note that, in the present embodiment, the optical disk player 30 is capable of writing data in and reading data from not only the DVD but also a CD.

An optical disk 10, e.g., DVD, is rotated by a spindle motor 12. An optical pick-up 14 is moved in the radial direction of the optical disk 10 so as to write data in and read data from the optical disk 10.

The optical pick-up 14 includes a laser diode (not shown) irradiating a laser beam to the optical disk 10, an object lens (not shown) focusing the laser beam on the recording layer of the optical disk 10, a photo diode 15 receiving the laser beam reflected on the optical disk 10, etc.

The photo diode 15 has a plurality of light receiving faces. Intensities of the reflected beam respectively detected in the light receiving faces are compared. Then, push-pull signal "a" is read from the reflected beam on the basis of differenced of the intensities. The photo diode 15 can read not only the push-pull signal "a" but also tracking error signals, focusing error signals, etc. on the basis of the intensities detected in the light receiving faces. The error signals are sent to a servo control section 17 so as to servo-control a tracking servo mechanism, a focusing servo mechanism, a spindle servo mechanism, etc.

An LPP signal detecting circuit 18 is connected to the optical pick-up 14. In the present embodiment, the LPP signal detecting circuit 18 includes a comparator.

Figure 8:
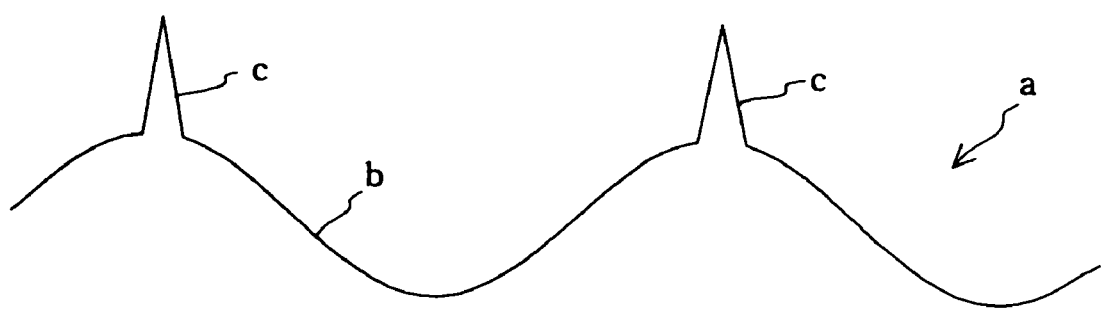
FIG. 8 is an explanation view of the push-pull signal.

The push-pull signal "a", which has been read by the optical pick-up 14, and the slice signal "d" are inputted to the LPP signal detecting circuit 18. The push-pull signal "a" is slice-shaped on the basis of voltage of the slice signal "d" so as to extract only LPP components "c" (see FIG. 8) included in the push-pull signal "a". The LPP components "c" detected are binarized and formed into LPP signals "e", which are digital signals.

A slice signal generating circuit 20 is connected to the LPP signal detecting circuit 18. The slice signal generating circuit 20 defines voltage level of the slice signal "d". Note that, in the present embodiment, the slice signal "d" is formed by through-rate-processing the push-pull signal "a", and amplitude and wave length of the slice signal are equal to those of the wobble component "b". The slice signal generating circuit 20 has the through rate function.

The LPP signals "e" detected by the LPP signal detecting circuit 18 are inputted to a drive control section 24, which controls writing data, etc. The drive control section 24 uses the LPP signals "e" as time data so as to perform control actions.

The LPP signals "e" are inputted to and detected by a control section 26.

The control section 26 is capable of calculating degree of pulse width of the LPP signals "e". The dispersion is calculated as standard deviation, variance, etc. The variance means an average of square of differences between data and average thereof; and the standard deviation means a square root of the variance.

The control section 20 controls the slice signal generating circuit 20 on the basis of the degree of dispersion of the pulse width of the LPP signals "e" and defines the voltage level of the slice signal "d".

Namely, the control section 26 controls the slice signal generating circuit 20 so as to gradually change the voltage of the slice signal "d" close to peak voltage of the wobble component "b" with checking the degree of dispersion of the pulse width of the LPP signals "e". When the pulse width of the LPP signals "e" suddenly disperse or the degree of the dispersion exceeds a predetermined threshold value, the control section 26 judges that the slice signal "d" overlaps the wobble component "b" or a noise included in the wobble component "b". Then, the control section 26 controls the slice signal generating circuit 20 so as to make the voltage of the slice signal changes a predetermined value (a correction value) and slightly separate the slice signal "d" from the wobble component "b". The voltage of the slice signal "d" is corrected by adding or subtracting the correction value.

The correction value, which will be added to or subtracted from the voltage of the slice signal overlapping the wobble component "b" or noises, have been previously stored in memory means 28, e.g. ROM, which is connected to the control section 26.

In the present embodiment, a plurality of correction values, which correspond to types of DVDs, have been previously measured by experiments.

Figure 6:
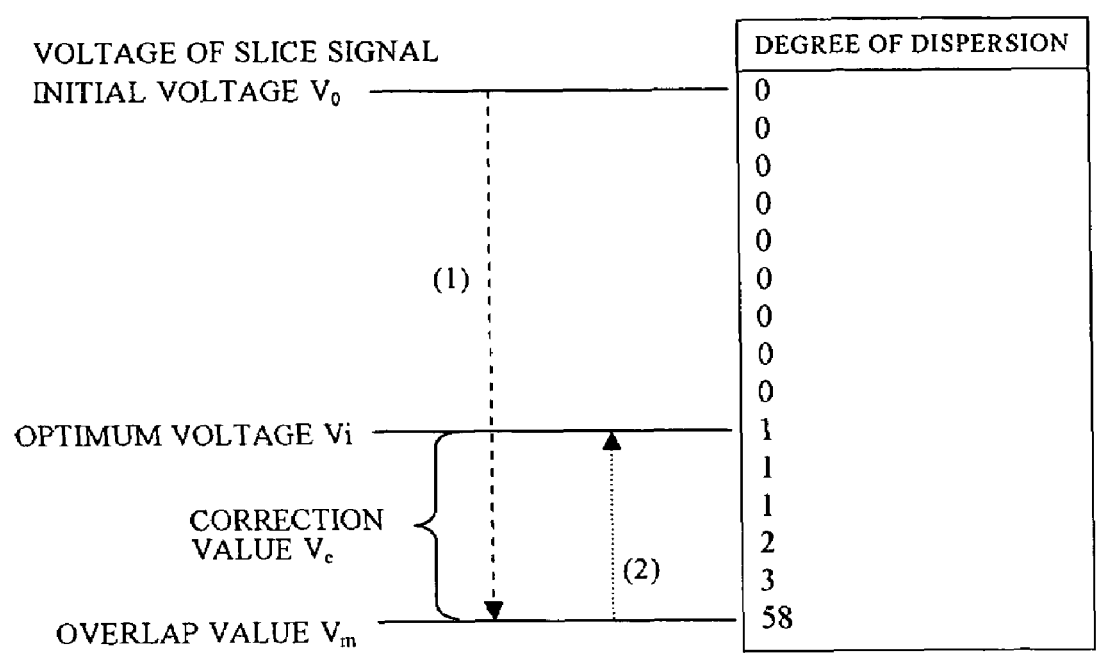
FIG. 6 is an explanation view showing a relationship between the slice signal and dispersion of pulse width of LPP signals.

Next, a method of detecting the LPP signals "e" performed in the optical disk player 30 will be explained with reference to FIGS. 2-6. Note that, FIG. 6 shows an outline of defining the voltage of the slice signal "d".

Figure 2:
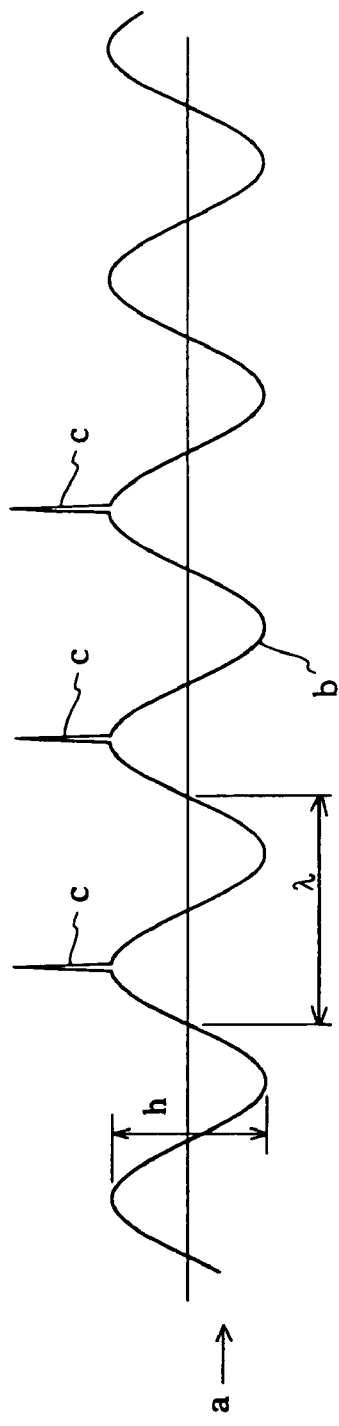
FIG. 2 is an explanation view of a push-pull signal.

The push-pull signal "a" is shown in FIG. 2. As described above, the push-pull signal "a" is generated on the basis of the reflected beam received by the optical pick-up 14. Namely, the reflected beam is received by a plurality of the light receiving faces of the photo detector 15, and differences of the intensities in the light receiving faces are detected so as to generate the push-pull signal "a".

Since the groove 5 of the DVD 10 is wobbled or meandered and the LPPs are formed in the groove 5 (see FIG. 7), the push-pull signal "a" includes the wobble component "b" and the LPP components "c".

Namely, the push-pull signal "a" includes the wobble component "b", which have a sine waveform with nearly fixed amplitude "h" and nearly fixed wave length "λ", and the LLP components "c", which appear at the maximum peaks of the wobble component "b".

To extract the LPP components "c" from the push-pull signal "a", signals, whose voltage is higher than that of the wobble component "b", are extracted by slice-shaping. In the slice-shaping process, the slice signal "d" generated by the slice signal generating circuit 20 is used as a standard signal for slicing the push-pull signal "a".

Figure 3:
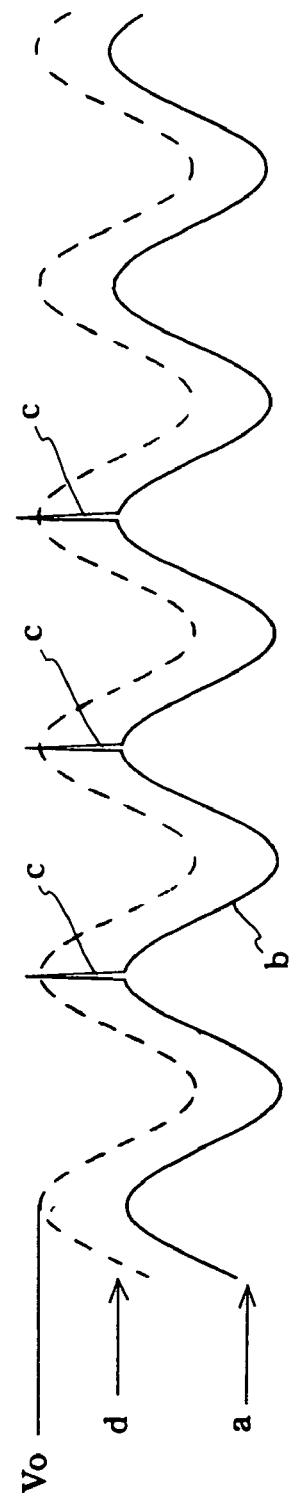
FIG. 3 is an explanation view of the push-pull signal and a slice signal having initial voltage.

As shown in FIG. 3, the amplitude, wave length and a phase of the slice signal "d" correspond to those of the wobble component "b". The slice signal "d", whose waveform corresponds to the waveform of the wobble component "b", may be formed by through-rate-processing the push-pull signal "a".

The voltage of the slice signal "d" is defined in an initializing step of the optical disk player 30.

When the optical disk 10 is set in the optical disk player 30, the optical disk player 30 executes the initializing step, in which a type of the optical disk 10 is recognized. If the optical disk 10 is a DVD including LPPs, the control section 26 identifies a type of the DVD 10 and stores the type in the memory means 26.

Next, the control section 26 gradually changes the voltage of the slice signal "d" from an initial value Vo to the voltage of the wobble component "b" (see an arrow (1) shown in FIG. 6).

The control section 26 gradually changes the voltage of the slice signal "d" from the initial value Vo with calculating and checking the degree of the dispersion (e.g., standard deviation) of pulse width of the PLL signals "e".

The waveform of the slice signal "d" is separated from that of the wobble component "b", the pulse width of the PLL signals "e" are nearly fixed, so the degree of the dispersion is nearly zero.

Figure 4:
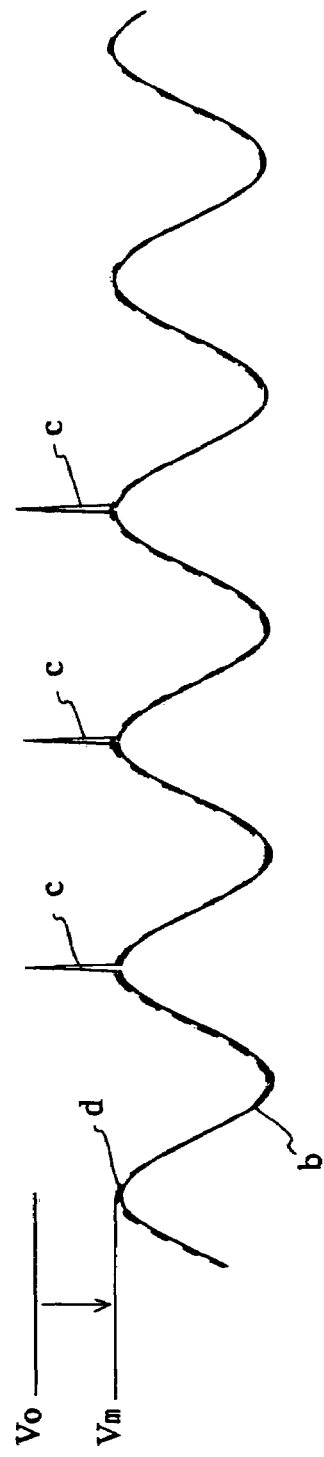
FIG. 4 is an explanation view of the slice signal overlapping a wobble component.
Figure 5:
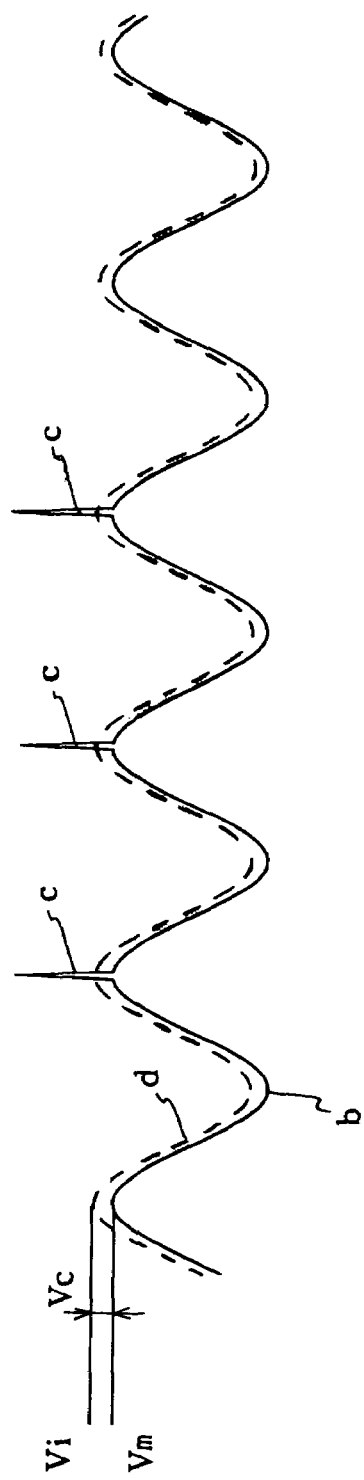
FIG. 5 is an explanation view of the slice signal separating from the wobble component.

When the waveform of the slice signal "d" is made close to that of the wobble component "b" as shown in FIG. 4, the degree of the dispersion suddenly becomes great. At that time, the waveform of the slice signal "d" overlaps the waveform of the wobble component "b" or a noise included in the wobble component "b". The voltage of the slice signal "d" overlapping the wobble component "b" or the noise is an overlap value Vm.

The judgment of overlapping is performed by comparing the degree of the dispersion with the predetermined threshold value. The threshold value has been previously stored in the memory means 28.

In the present embodiment, the voltage of the slice signal "d" must be higher than the overlap value Vm.

The control section 26 reads the correction value Vc, which corresponds to the type of the DVD 10, from the memory means 28.

Next, the correction value Vc is added to the overlap value Vm so as to determine the optimum voltage Vi (see an arrow (2) shown in FIG. 6).

If a DVD, whose type is not registered in the optical disk player 30, is set, a standard correction value, which has been previously defined as a default value, may be used as the correction value.

By using the value Vi, which is Vm+Vc, as the voltage of the slice signal "d", the waveform of the slice signal "d" can be moved very close to that of the wobble component "b" without overlapping the wobble component "b" and noises, so that only the LPP signals "e" can be securely detected.

In the above described embodiment, the LPP components "c" are projected (upward in the waveform) from the maximum peaks of the wobble component "b".

In the case that the LPP components "c" are projected (downward in the waveform) from the minimum peaks of the wobble component "b", the optimum voltage Vi is given by subtracting the correction value Vc from the overlap value Vm.

In the above described embodiment, the correction values, which will be added or subtracted, are selected on the basis of types of DVDs, but the correction value may be a fixed value.

In the above described embodiment, the amplitude and wave length of the slice signal "d" are equal to those of the wobble component "b", but a waveform of the slice signal is not limited to the embodiment. For example, a signal having a linear waveform with fixed voltage may be employed as the slice signal "d".

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of detecting land pre-pit (LPP) signals from a digital video disk (DVD), in which land pre-pits are formed in a groove, comprising the steps of:

reading a push-pull signal including a wobble component and LPP components, which appear at peaks of the wobble component; and slice-shaping the push-pull signal with a prescribed slice signal so as to binarize the LPP components and detect the LPP signals, characterized by:

detecting pulse widths of the LPP signals with gradually changing voltage of the slice signal close to that of the wobble component;

calculating degree of dispersion of the pulse widths of the LPP signals;

stopping the change of the voltage of the slice signal when the degree of dispersion exceeds a predetermined threshold value; and correcting the voltage of the slice signal, which is the voltage when the degree of dispersion exceeds the threshold value, on the basis of a predetermined correction value so as to use the corrected voltage of the slice signal as the voltage of the slice signal.

2. The method according to claim 1, wherein amplitude and frequency of the slice signal are equal to those of wobble component.

3. The method according to claim 1, wherein the correction value is previously determined on the basis of a type of the DVD.

4. An optical disk player, comprising:

an optical pick-up reading a push-pull signal including a wobble component and land pre-pit (LPP) components, which appears at peaks of the wobble component, from a digital video disk (DVD), in which land pre-pits are formed in a groove;

LPP signal detecting means for slice-shaping the push-pull signal with a slice signal so as to binarize the LPP components and detect LPP signals;

means for forming the slice signal; and control means for detecting pulse widths of the LPP signals with gradually changing voltage of the slice signal close to that of the wobble component; calculating degree of dispersion of the pulse widths of the LPP signals; stopping the change of the voltage of the slice signal when the degree of dispersion exceeds a predetermined threshold value; and correcting the voltage of the slice signal, which is the voltage when the degree of dispersion exceeds the threshold value, on the basis of a predetermined correction value so as to use the corrected voltage of the slice signal as the voltage of the slice signal.

5. The optical disk player according to claim 4, wherein amplitude and frequency of the slice signal are equal to those of wobble component.

6. The optical disk player according to claim 4, further comprising means for storing the correction value, which is previously determined on the basis of a type of the DVD.

* * * * *